(12) United States Patent
Baehrle-Miller et al.

(10) Patent No.: US 10,981,550 B2
(45) Date of Patent: Apr. 20, 2021

(54) METHOD AND DEVICE FOR OPERATING A HYDRAULIC BRAKE SYSTEM, BRAKE SYSTEM

(71) Applicant: Robert Bosch GmbH, Stuttgart (DE)

(72) Inventors: Frank Baehrle-Miller, Schoenaich (DE); Helmut Wolff, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 22 days.

(21) Appl. No.: 15/824,404

(22) Filed: Nov. 28, 2017

(65) Prior Publication Data

US 2018/0148028 A1    May 31, 2018

(30) Foreign Application Priority Data

Nov. 30, 2016  (DE) .................... 10 2016 223 808.6

(51) Int. Cl.
| | |
|---|---|
| *B60T 13/66* | (2006.01) |
| *B60T 13/16* | (2006.01) |
| *B60T 8/48* | (2006.01) |
| *B60T 8/32* | (2006.01) |
| *B60T 13/58* | (2006.01) |
| *B60T 7/04* | (2006.01) |
| *B60T 8/24* | (2006.01) |
| *B60T 8/26* | (2006.01) |
| *B60T 13/74* | (2006.01) |
| *B60T 17/22* | (2006.01) |

(52) U.S. Cl.
CPC .............. *B60T 13/16* (2013.01); *B60T 7/042* (2013.01); *B60T 8/245* (2013.01); *B60T 8/26* (2013.01); *B60T 8/32* (2013.01); *B60T 8/4872* (2013.01); *B60T 13/588* (2013.01); *B60T 13/741* (2013.01); *B60T 13/746* (2013.01); *B60T 17/221* (2013.01)

(58) Field of Classification Search
CPC .... B60T 13/588; B60T 13/745; B60T 13/746; F16D 2121/02; F16D 2121/24
See application file for complete search history.

(56) References Cited

U.S. PATENT DOCUMENTS

| | | | |
|---|---|---|---|
| 6,422,663 B1* | 7/2002 | Siepker ................... | B60T 7/12 188/DIG. 1 |
| 8,494,745 B2* | 7/2013 | Schneider ............... | B60T 7/107 303/3 |

(Continued)

*Primary Examiner* — Bradley T King
(74) *Attorney, Agent, or Firm* — Maginot, Moore & Beck LLP

(57) ABSTRACT

A method for operating a hydraulic brake system of a motor vehicle includes enabling a parking brake function by actuating a pressure generator and an actuator such that the pressure generator and the actuator together generate a total clamping force at a wheel brake, and actuating the pressure generator based on a movement of an actuator element and/or a brake piston, the movement generated by the actuator. The brake system includes the wheel brake having the brake piston, a brake pedal device, the pressure generator configured to actuate the wheel brake, the actuator assigned to the wheel brake and having the actuator element configured to actuate the wheel brake. A force that displaces the brake piston in order to actuate the wheel brake is generated by the pressure generator and/or the actuator.

13 Claims, 3 Drawing Sheets

(56) References Cited

U.S. PATENT DOCUMENTS

| | | | | |
|---|---|---|---|---|
| 8,938,347 | B2* | 1/2015 | Baehrle-Miller | B60T 7/107 |
| | | | | 701/70 |
| 9,114,792 | B2* | 8/2015 | Bieltz | B60T 7/042 |
| 2006/0186731 | A1* | 8/2006 | Bach | B60T 7/104 |
| | | | | 303/89 |
| 2006/0267402 | A1* | 11/2006 | Leiter | B60T 7/107 |
| | | | | 303/20 |
| 2010/0211281 | A1* | 8/2010 | Baier-Welt | B60T 7/12 |
| | | | | 701/70 |
| 2011/0224880 | A1* | 9/2011 | Baehrle-Miller | B60T 7/042 |
| | | | | 701/70 |
| 2012/0205202 | A1* | 8/2012 | Baehrle-Miller | B60T 13/588 |
| | | | | 188/106 P |
| 2013/0001027 | A1* | 1/2013 | Baehrle-Miller | F16D 65/18 |
| | | | | 188/106 F |
| 2013/0226426 | A1* | 8/2013 | Baehrle-Miller | B60T 13/588 |
| | | | | 701/70 |
| 2013/0261917 | A1* | 10/2013 | Kotake | B60T 13/741 |
| | | | | 701/70 |
| 2013/0338896 | A1* | 12/2013 | Baehrle-Miller | B60T 7/042 |
| | | | | 701/70 |
| 2015/0041257 | A1* | 2/2015 | Baehrle-Miller | B60T 8/171 |
| | | | | 188/1.11 E |
| 2015/0217743 | A1* | 8/2015 | Blattert | B60T 7/122 |
| | | | | 701/70 |
| 2018/0148023 | A1* | 5/2018 | Mannherz | B60T 13/74 |

* cited by examiner

METHOD AND DEVICE FOR OPERATING A HYDRAULIC BRAKE SYSTEM, BRAKE SYSTEM

This application claims priority under 35 U.S.C. § 119 to patent application no. DE 10 2016 223 808.6, filed on Nov. 30, 2016 in Germany, the disclosure of which is incorporated herein by reference in its entirety.

BACKGROUND

The disclosure relates to a method for operating a hydraulic brake system of a motor vehicle, wherein the brake system comprises at least one wheel brake, a brake pedal device and at least one pressure generator for hydraulically actuating the wheel brake, and also an electromechanical actuator which is allocated to the wheel brake, said actuator having a movable actuator element, in particular a spindle nut, for actuating the wheel brake, wherein a force for displacing a brake piston of the wheel brake so as to actuate said wheel brake can be generated in each case by means of the pressure generator and actuator, and wherein in order to enable a parking brake function the pressure generator and the actuator are actuated in such a manner that said pressure generator and actuator generate a total clamping force or total braking force on the wheel brake.

Furthermore, the disclosure relates to a device for operating a brake system of this type and also to a corresponding brake system.

Methods, devices and brake systems of the type mentioned in the introduction are known from the prior art. Brake systems of motor vehicles, which brake systems can be operated by the driver of a motor vehicle by means of a brake pedal device, function in general in a hydraulic manner and for this purpose comprise one or multiple brake circuits which are connected to the brake pedal device in a hydraulic manner. If the driver actuates a brake pedal of the brake pedal device, a hydraulic pressure is thus generated in the brake system or the respective brake circuit, said pressure acting on one or multiple wheel brakes in order to displace a brake piston of the respective wheel brake with the result that a clamping force or brake application force is generated by means of which a brake disk is clamped between brake pads of the wheel brake. An adhesive friction is generated by means of the clamping procedure, said friction acting in a braking manner on the brake disk and thereby on a wheel of the motor vehicle, said wheel being connected in a non-rotatable manner to the brake disk. Usually, one or multiple valves which can be actuated are interconnected between the wheel brake and the brake pedal device, which in addition to the brake pedal generally also comprises a master brake cylinder and where appropriate a brake booster, said valves distributing the generated hydraulic pressure to multiple wheel brakes.

In order to fulfill a parking brake function, in which the wheel brake or the wheel brakes permanently maintain a clamping force without it being necessary to provide further energy, it is known to integrate in the brake circuit a pressure generator which can be actuated, said pressure generator being designed to generate a hydraulic pressure in the brake circuit in an automated manner on demand. If the desire to enable a parking brake function is ascertained, the pressure generator is actuated in order to increase the hydraulic pressure with the result that a corresponding braking force is produced at the respective wheel brake. The valves of the brake circuit are subsequently closed in such a manner that the pressure can no longer escape from the wheel brake and as a consequence the braking force is maintained.

It is also known to allocate an electromechanical actuator to the respective wheel brake, said actuator likewise acting on the brake piston in order to produce the clamping force or braking force in an automated manner on demand. In general, an actuator of this type comprises an electric motor whose torque and/or rotational movement are/is transferred by means of a transmission, in particular a spindle system, to the brake piston. It is also possible to maintain the clamping force by means of a self-locking embodiment of the transmission without having to maintain a further energy supply of the electric motor.

Brake systems have also become known in which in order to enable the parking brake function both the actuator and the pressure generator are actuated with the result that the brake piston is moved or influenced by means of superimposed driving forces. However, it is possible for behavior which is unusual to the driver to occur at the brake pedal as a result of this superimposition. If the brake piston is displaced by means of the actuator with the result that the volume for the hydraulic medium in the wheel brake increases, the pressure in the hydraulic system reduces, which leads to the brake pedal moving towards the floor. If the hydraulic pressure subsequently increases, the brake pedal is thus moved backwards away from the floor, as a result of which a forward movement and backward movement occurs that is unusual for the driver.

SUMMARY

The method in accordance with the disclosure ensures that the behavior of the brake pedal is improved. In accordance with the disclosure, this is achieved by virtue of the fact that when the parking brake function is enabled, the pressure generator is controlled in dependence on a movement of the actuator element and/or of the brake piston, said movement being generated by means of the actuator. It is also provided that a movement of the actuator element and/or the brake piston is ascertained and is actuated in dependence on the movement of the pressure generator with the result that in particular a volume increase which occurs as a result of the movement of the brake piston is compensated by means of the pressure generator, as a result of which the brake pedal moves toward the floor during the superimposing actuation of the wheel brake or the parking brake function. It is preferred that the pressure generator is already actuated at a first movement of the actuator element, in particular of the spindle nut of the electromechanical actuator, for the purpose of feeding a first hydraulic pressure into the brake system with the result that holding of the motor vehicle is made possible. Furthermore, alternatively or in addition a hydraulic pressure is generated by actuating the pressure generator as soon as the actuator element entrains the brake piston. However, the pressure generator can also be actuated in such a way that the buildup of pressure already starts shortly prior to the actuator element arriving at and entraining the brake piston.

It is preferred that the pressure generator is embodied as an electromechanical brake booster and is integrated into the brake pedal device of the brake system. Alternatively, the pressure generator is embodied as a separate pressure generator in the brake system, in particular by means of a pump which can be driven/is driven by an electric motor, said pump in particular functioning independently of a brake booster of the brake pedal device. In accordance with a further embodiment, it is preferably provided that the brake system comprises both the pressure generator which is formed by means of the electric motor and pump, as well as an electromechanical brake booster as a further pressure generator so that it is ensured that a redundant hydraulic pressure provision is available.

Furthermore, it is preferably provided that when the parking brake function is enabled the pressure generator is actuated in dependence on a rate of movement of the actuator element and/or of the brake piston, said rate of movement being generated by means of the actuator. Consequently, the rate of movement of the brake piston is monitored as a movement of the brake piston and is taken into account when actuating the pressure generator in order to be able to compensate the volume increase of the wheel brake by conveying further hydraulic medium into the brake circuit or the brake system in such a manner that the pedal is prevented from moving towards the floor. By virtue of preventing the brake pedal from moving towards the floor, it is also ensured that movement away from the floor as a result of the subsequent increasing hydraulic pressure is prevented, as a result of which unexpected behavior of the brake pedal as a result of applying the parking brake is avoided.

Furthermore, it is preferably provided that when the parking brake function is enabled, a switching valve between the brake pedal device and the brake circuit is actuated in such a manner that a return flow of hydraulic medium from the brake circuit into the brake pedal device is prevented. In particular the switching valve is closed for this purpose. As a consequence, it is ensured that the hydraulic pressure which is present in the brake circuit cannot escape in the direction of the brake pedal device and instead, is retained in the brake circuit, as a result of which the compensation of the increase in volume by the pressure generator is simplified. If a high pressure switching valve is connected in parallel to the switching valve, said high pressure switching valve is thus preferably actuated in this state in such a manner that said high pressure switching valve is opened in the direction of the wheel brake or brakes, with the result that the driver can continue to build up pressure in the brake system by actuating the brake pedal.

Furthermore, it is preferably provided that if the brake system comprises multiple brake circuits, the brake circuits are actuated differently in dependence on an angle of inclination of the motor vehicle so as to enable the parking brake function. By taking into account the angle of inclination of the motor vehicle it is possible to determine whether it is necessary to apply a high or a low parking braking force in order to securely hold the motor vehicle at a standstill. If the motor vehicle is located by way of example on a road having a large angle of inclination, a higher braking force is thus necessary than on a road having a small angle of inclination. Furthermore, taking the angle of inclination into account makes it possible to actuate the brake circuits independently of one another so as to enable the parking brake function. In particular, it is provided that in dependence on the angle of inclination only one or multiple brake circuits of the brake system are actuated so as to enable the parking brake function.

It is preferably provided that in the case of a small angle of inclination only one brake circuit which is allocated to a rear axle of the motor vehicle is actuated so as to enable the parking brake function. As a consequence, it is achieved that the expenditure of energy for enabling the parking brake function is reduced or is kept small and nevertheless it is ensured that the motor vehicle is securely held at a standstill on the road.

Furthermore, it is preferably provided that an operating current of the actuator is monitored as when enabling is performed and that in dependence on the operating current the rate of movement of the actuator element and where appropriate of the brake piston is determined. It is assumed that, as the rate of movement reduces owing to an increasing counter force, the operating current increases with the result that with the knowledge of the characteristic curve of the operating current it is possible to determine the position and the rate of movement of the actuator element and of the brake piston. In particular, it is provided that the prevailing rate of movement of the actuator element and/or of the brake piston is determined in dependence on the operating current by means of a characteristic diagram or a characteristic line.

In accordance with a preferred further development of the disclosure, it is provided that the pressure generator is actuated in dependence on the operating current. In contrast to the above-described embodiment, it is provided that the actuation of the pressure generator is performed directly in dependence on the operating current with the result that it is not initially necessary to determine a rate of movement of the brake piston. As a consequence, a direct and rapid actuation of the pressure generator is ensured.

The device in accordance with the disclosure is further characterized by means of an actuation device which is configured specifically for the purpose of implementing the method in accordance with the disclosure for its intended use. The above-mentioned advantages are provided as a consequence.

The brake system in accordance with the disclosure is characterized by means of the actuation device in accordance with the disclosure. The above-mentioned advantages also apply here.

BRIEF DESCRIPTION OF THE DRAWINGS

Further advantages and preferred features and feature combinations are evident in what has been described above and also in the claims. The disclosure is to be further discussed hereinunder with reference to the drawing. For this purpose in the drawings:

DETAILED DESCRIPTION

Figure 1:
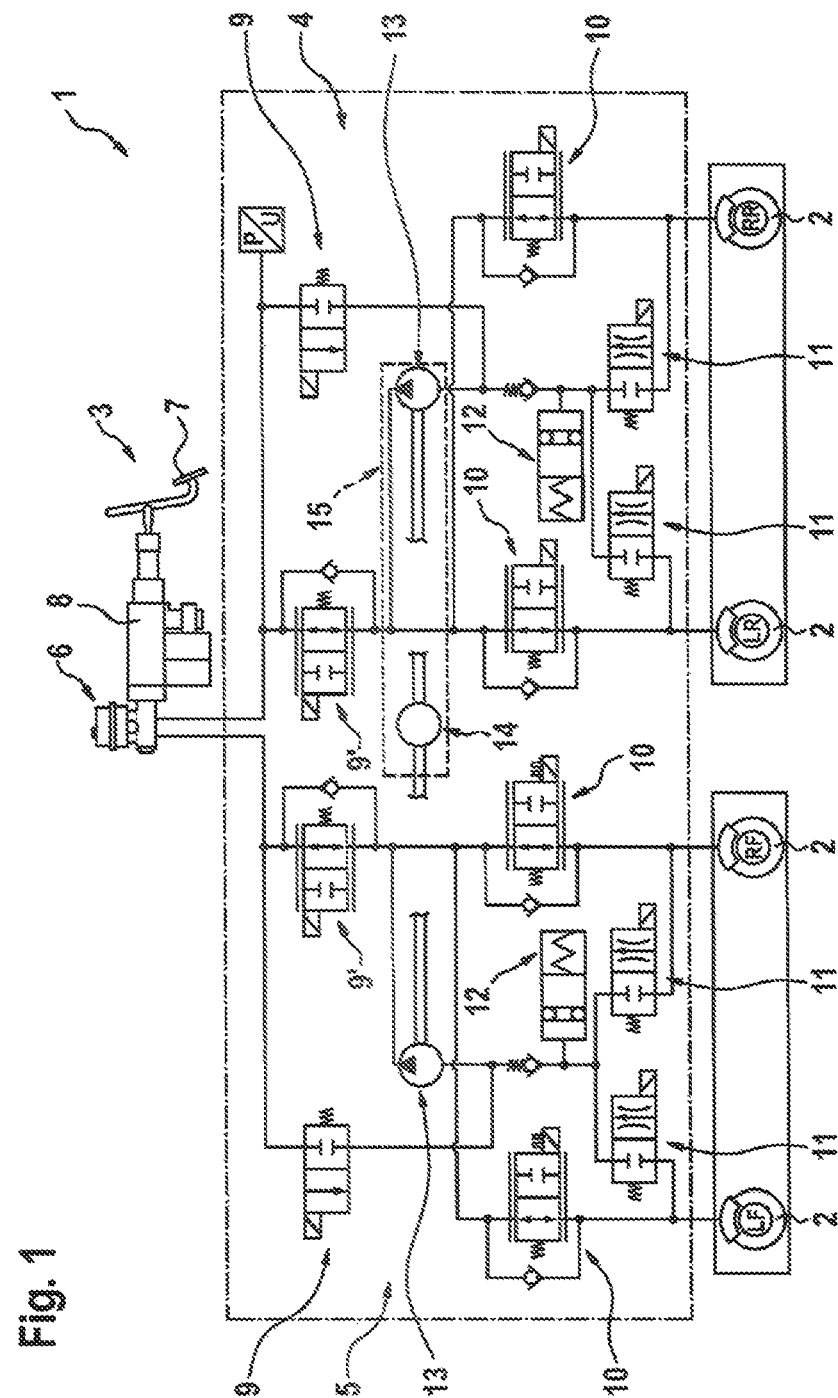
FIG. 1 illustrates a brake system of a motor vehicle in a simplified view.

FIG. 1 illustrates in a simplified view a brake system 1 for a motor vehicle which is not further illustrated. The brake system 1 comprises multiple wheel brakes 2 which can be operated by a driver of the motor vehicle by means of a brake pedal device 3 as operating brakes. The wheel brakes 2 are referred to as LF, RF, LR and RR, as a result of which their position or allocation on the motor vehicle is explained, wherein LR stands for left rear, RF stands for right front, LF stands for left front and RR stands for right rear. Two brake circuits 4 and 5 are embodied between the brake pedal device 3 and the wheel brakes 2, wherein the brake circuit 4 is allocated to the wheel brakes LR and RR and the brake circuit 5 is allocated to the wheel brakes LF and RF. The two brake circuits 4 and 5 are constructed identically, and the construction of the two brake circuits 4, 5 will therefore be further explained hereinunder with reference to the brake circuit 4.

The brake circuit 4 is initially connected to a master braking cylinder 6 of the brake pedal device 3, wherein the brake pedal device 3 moreover comprises a brake pedal 7 that can be actuated by the driver, and also an electromechanical brake booster 8. The brake circuit 4 comprises a switching valve 9' and also a high pressure switching valve 9 which are connected parallel to one another and follow the master braking cylinder 6. The switching valve 9' is open when not energized with current and allows a flow of the hydraulic medium of the brake circuit, in other words the brake fluid, in both directions. The high pressure switching valve 9 is embodied as closed when not energized with current and allows in the energized state a through flow of brake fluid only in the direction of the wheel brake 2. The switching valve 9' is furthermore connected to the two wheel brakes 2 with an intermediate connection in each case of an inlet valve 10 which is embodied as opened in both directions when not energized with current. Moreover, an outlet valve 11 is allocated in each case to the wheel brakes 2 of the brake circuit 4, said outlet valve being embodied as closed in the non-energized state. A hydraulic pressure storage device 12 is connected downstream of the outlet valves 11. Moreover, the outlet valves 11 are connected on the outlet side to a suction side of a pump 13 that is connected to the brake circuit 4 on the pressure side between the switching valve 9' and the inlet valves 10. The pump 13 is mechanically coupled to an electric motor 14, wherein the pump 13 and the electric motor 14 together form a pressure generator 15 of the brake system 1. It is provided that the electric motor 14 is allocated to the pumps 13 of the two brake circuits 4 and 5. Alternatively, it can also be provided that each brake circuit 4, 5 comprises a dedicated electric motor 14.

If the two switching valves 9' of the brake circuits 4, 5 are closed, the hydraulic pressure in the section of the brake circuits 4, 5 that lies to the rear, in other words between the switching valves and the wheel brakes, remains confined or is maintained, even if the brake pedal 7 is released by the driver.

Figure 2:
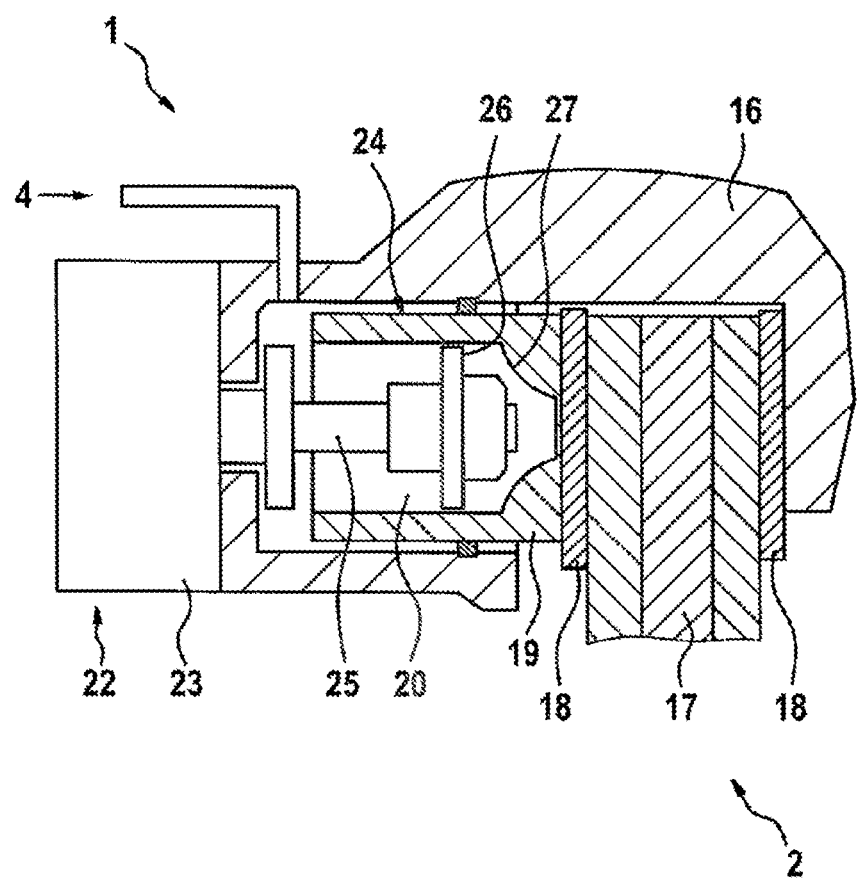
FIG. 2 illustrates a wheel brake of the brake system in a simplified sectional view.

FIG. 2 illustrates a simplified sectional view of the embodiment of the wheel brakes 2. The respective wheel brake 2 comprises a brake caliper 16 which grips around a brake disk 17 on the end faces of said brake caliper, said brake disk being connected in a non-rotatable manner to a wheel of the motor vehicle. Each end face of the brake disk 14 is allocated a brake pad 18 of the wheel brake 2. One of the brake pads 18 is embodied or arranged on an end face of a brake piston 19 which is mounted in a displaceable manner on the brake caliper 16. The brake piston 19 comprises in the longitudinal section a beaker-shaped structure with the result that said brake piston forms a hollow chamber 20 together with a receiving arrangement 21 in which the brake piston 19 is mounted in a displaceable manner. The hollow chamber 20 is connected in a fluidic manner to the inlet valve 10 with the result that if the inlet valve 10 and the switching valve 8 are open and the brake pedal 7 is actuated, the hydraulic pressure acts on the brake piston 19 in order to displace said brake piston against the brake disk 17, as a result of which the brake disk 17 is braced or clamped between the brake pads 18 of the wheel brake 2. Alternatively, by closing the switching valve 8 and actuating the pressure generator 15 the hydraulic pressure can be generated in the brake circuit 4 in an automated manner. This is true in the present case when the driver operates a button or switch to actuate a parking brake.

Moreover, an electromechanical actuator 22 is allocated to the brake piston 19, said electromechanical actuator comprising an electric motor 23 and a transmission 24 which is operatively connected to the electric motor 23. The transmission is embodied as a spindle transmission which comprises a spindle 25 which is connected in a non-rotatable manner to the electric motor 23, and also a spindle nut 26 which is mounted in a non-rotatable manner in the brake piston 19 and in a longitudinally displaceable manner on the spindle 25. If the spindle is driven by means of the electric motor 23 as a consequence the spindle nut 26 is displaced longitudinally in the brake piston 19. The spindle nut 26 can be displaced by means of the rotational movement of the spindle 25 in such a manner that said spindle nut makes contact with an axial stop 27 of the brake piston 19 in the chamber 20, as a result of which the brake piston 19 is carried along by the spindle nut 26. Consequently, it is likewise possible by actuating the actuator 22 to apply a force to the brake piston 19 to displace said brake piston, which force is superimposed or can be superimposed by the force that is applied by means of the hydraulic pressure.

Figure 3:
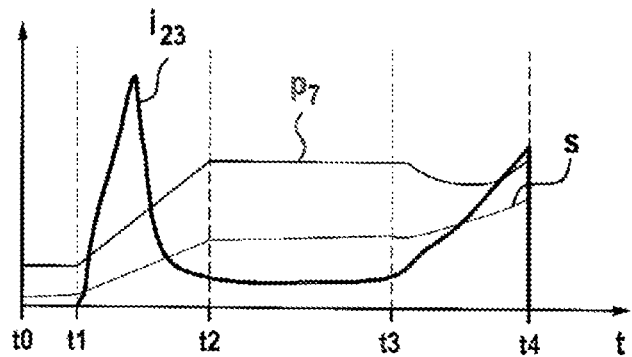
FIG. 3 illustrates a first diagram explaining a superimposing actuation of the wheel brake.
Figure 4:
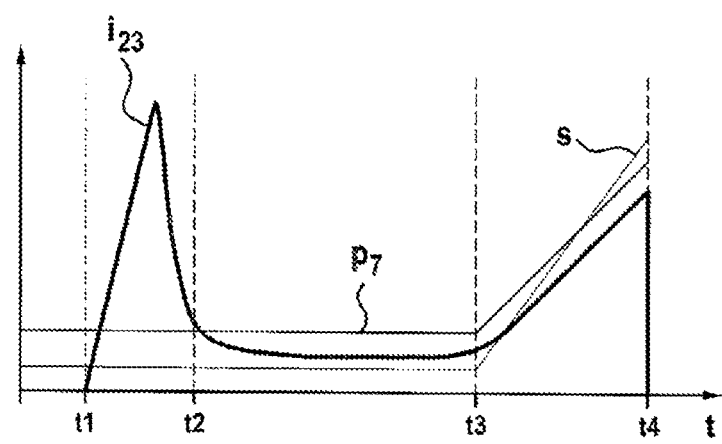
FIG. 4 illustrates a second diagram explaining an advantageous method for operating the brake system.

The behavior of the brake pedal 7 is to be explained with reference to FIG. 3. The diagram illustrates the pedal travel s plotted over the time t, the current curve $i_{23}$ of the operating current of the electric motor 23 and also a pre-pressure p7 which is produced by the driver and which the driver applies by means of actuating the brake pedal 7 in the brake system 1. It is assumed here that at a point in time $t_0$ the driver himself has already generated a hydraulic pressure in the brake system 1 by actuating the brake pedal 7 and for this purpose the brake pedal 7 is already actuated in this respect. At a subsequent point in time $t_1$, the driver actuates by way of example a parking brake switch in order to enable the parking brake function of the brake system 1. At this moment, the current consumption of the electric motor 23 starts and the current $i_{23}$ increases. Simultaneously, the pressure generator 15 is actuated. If the actuator 22 functions more rapidly than the pressure generator 15, this has the consequence that the volume of the chamber 20 increases more rapidly than brake fluid is pushed into the hollow chamber 20 by means of the pressure generator 15. This has the consequence that the hydraulic pressure in the respective brake circuit 4, 5 decreases and the brake pedal 7 moves slightly towards the floor, as is illustrated in FIG. 3. If the pressure generator 15 is integrated into the brake pedal device 3, by way of example as an electrohydraulic brake booster, thus with the start of enabling the parking brake function initially an increase in pressure occurs by means of the pressure generator 15 while the actuator 22 is comparatively slow, as a result of which the brake pedal 7 likewise moves towards the floor. As soon as the actuator 22 has likewise built up force, it is necessary for the pressure generator 15 to readjust the pressure, which leads to a new brake pedal movement.

By virtue of the method described hereinunder which in particular is implemented by an actuation device which is not illustrated, the hydraulic pressure in the brake circuit 4, 5 is initially conserved. While previously in accordance with FIG. 3 a hydraulic pressure has been initially increased to a desired pressure at the point in time t2, it is now provided that the hydraulic pressure is maintained with the result that the pedal travel s and the driver pre-pressure $p_7$ likewise remain constant even while the actuator 22 is actuated at the point in time t1. Only when the force increases at a point in time t3, after a pre-travel clearance or a zero clearance of the actuator 22 has been overcome, is said increased force superimposed by means of the pressure generator 15. Both the hydraulic pressure as well as the curve of the operating current $i_{23}$ increase steadily. This altogether effects the pedal behavior in such a manner that said pedal behavior is comparable to a conventional parking brake.

At the start of the enabling of the parking brake function, it is initially determined whether the hydraulic pressure which is supplied is sufficient to hold the motor vehicle at a standstill. If the hydraulic pressure is sufficient, the switching valves 8 of the brake circuit 4 and/or 5 are closed with the result that further pressure can be built up by actuating the brake pedal 7. If the hydraulic pressure is not sufficient, the hydraulic pressure which is required to hold the vehicle at a standstill is introduced by means of the pressure generator 15, by way of example as in the present case, or as the pressure generator which is integrated into the brake pedal device 3, in particular as an electromechanical brake booster 8. The brake pedal 7 moves slightly towards the floor which naturally is not noticed if the driver is not actuating the brake pedal 7 at this point in time.

The hydraulic pressure furthermore remains confined. The pressure generator 15 or the brake booster 8 is not actuated further as long as electromechanical clamping force is not provided by means of the actuator 22. If it is identified that an electromechanical clamping force is building up by means of the actuator 22, the hydraulic pressure in particular only increases at the rear axle of the motor vehicle, in particular at the same time as the clamping force increase by means of the actuator 22.

In the present case, the rate at which the pressure increases is adjusted to the speed of the movement of the brake piston 19 which is produced by adjusting the actuator 22 and in fact in such a manner that the actuator 22 and the pressure generator 15 or the brake booster achieve their desired values or target values at the same point in time. The electromechanical system would be relieved of loading too quickly as a result of hydraulic pressure support which was provided too rapidly with the result that the current curve $i_{23}$ no longer increases. The electromechanical system would not be sufficiently relieved of loading as a result of a hydraulic pressure support which was provided too slowly, with the result that the current curve $i_{23}$ increases too rapidly. This has the consequence that the actuator 22 overtakes the pressure generator 15. In this case, the actuator 22 is either supplied with energy for as long as it takes for the pressure generator 15 to achieve the target pressure or said actuator is temporarily switched off and switched on again if the target pressure of the pressure generator 15 is reached.

While, in accordance with the present described exemplary embodiment, the pressure generator 15 is actuated so as to generate hydraulic pressure, said pressure generator comprising a pump 13 and electric motor 14, in accordance with an alternative preferred exemplary embodiment it is provided that the brake booster 8 is actuated as the pressure generator. In particular, the provision of the electromechanical brake booster 8 offers the advantage of a quiet buildup of pressure and an advantageous generation of force. Advantageously, the hydraulic pressure generator is therefore achieved by means of the electromechanical brake booster 8. The embodiment as a pressure generator 15 in contrast offers advantages in terms of cost. In accordance with a further exemplary embodiment, both the electromechanical brake booster 8 as well as the pressure generator 15 and the hydraulic pressure generator are provided in the brake system 1. This has the advantage that in the event of one of the hydraulic pressure generators being defective and failing, the remaining hydraulic pressure generator can still fulfill the desired to function. In this respect, advantageous redundancy is offered.

Furthermore, in accordance with an alternative exemplary embodiment, it is provided that the respective hydraulic pressure generator is actuated in dependence on a movement of the actuator element or the spindle nut 26 in other words independently of an actually-occurring movement of the brake piston 19. As a consequence, it is ensured that by way of example the hydraulic pressure is already increased shortly prior to the electromechanical actuator moving the brake piston 19 by means of the actuator element. The hydraulic pressure is also increased in such cases in which by way of example the electromechanical actuator 22 is no longer able to move the brake piston 19, such as by way of example after the driver applies full brakes, as a result of which a high hydraulic pre-pressure is introduced into the brake system 1. By virtue of the advantageous variant of the method, it is ensured that a hydraulic pressure support is also provided. Moreover, as a consequence an early hydraulic braking effect is achieved.

What is claimed is:

1. A method for operating a hydraulic brake system of a motor vehicle, the method comprising:
   activating a parking brake function for a wheel brake of a brake circuit in response to receiving a parking brake demand by:
   actuating an electromechanical actuator positioned within a hollow chamber formed by a brake piston of the wheel brake to move the electromechanical actuator into contact with the brake piston;
   maintaining a pressure within the hollow chamber constant as the electromechanical actuator is moved into contact with the brake piston;
   continuing actuation of the electromechanical actuator after the electromechanical actuator contacts the brake piston so as to generate an electromechanical displacement force on the brake piston;
   actuating a pressure generator during the continuing actuation of the electromechanical actuator to push brake fluid into the hollow chamber and generate a pressure displacement force, a clamping force of the brake piston acting on the wheel brake being a superposition of the electromechanical displacement force and the pressure displacement force; and
   adjusting the actuation of the pressure generator based on a speed of movement of the electromechanical actuator so as to adjust a rate at which the pressure increases within the hollow chamber during the superposition of the electromechanical displacement force and the pressure displacement force.

2. The method according to claim 1, further comprising:
   actuating a switching valve between a brake pedal device and the brake circuit to prevent a return flow of brake fluid from the brake circuit into the brake pedal device when the actuation of the pressure generator is initiated.

3. The method according to claim 1, wherein:
   the brake circuit is one of a plurality of brake circuits in the brake system; and
   the method further comprises actuating the plurality of brake circuits differently in dependence on an angle of inclination of the motor vehicle.

4. The method according to claim 3, further comprising:
   in the case of a small angle of inclination of the motor vehicle, actuating only the electromechanical actuator and pressure generator of one brake circuit of the plurality of brake circuits which is allocated to a rear axle of the motor vehicle.

5. The method according to claim 1, further comprising:
monitoring an operating current of the electromechanical actuator; and
determining the speed of movement of the electromechanical actuator in dependence on the operating current.

6. The method according to claim 5, wherein the adjusting of the actuation of the pressure generator is based on the operating current.

7. An actuation device configured to implement the method of claim 1.

8. The method of claim 1, wherein:
a target clamping force sufficient to hold the motor vehicle in place is formed from a superposition of a target electromechanical displacement force generated by the electromechanical actuator and a target pressure displacement force generated by the pressure generator;
the continuing actuation of the electromechanical actuator includes continuing the actuation so as to steadily increase the electromechanical displacement force from the point at which the electromechanical actuator contacts the brake piston until the electromechanical actuator generates the target electromechanical displacement force;
the adjusting of the actuation of the pressure generator includes adjusting the actuation from the point when the electromechanical actuator contacts the brake piston, based on the speed of movement of the electromechanical actuator, so as to steadily increase the pressure displacement force from the point at which the electromechanical actuator contacts the brake piston until the pressure displacement force reaches the target pressure displacement force; and
the continuing actuation of the electromechanical actuator and the adjusting of the actuation of the pressure generator are executed in such a way that the target electromechanical displacement force and the target pressure displacement force are reached at the same point in time.

9. A brake system for a motor vehicle comprising:
at least one wheel brake including a brake piston that forms a hollow chamber;
a brake pedal device;
at least one electrohydraulic pressure generator configured to push brake fluid into the hollow chamber to produce a pressure displacement force to actuate the brake piston of the at least one wheel brake;
an electromechanical actuator allocated to the at least one wheel brake and including a moveable actuator element positioned in the hollow chamber and configured to generate an electromechanical displacement force to actuate the brake piston of the at least one wheel brake; and
an actuation device configured to:
activate a parking brake function in response to receiving a parking brake demand by:
actuating the electromechanical actuator to move the electromechanical actuator into contact with the brake piston;
maintaining a pressure within the hollow chamber constant as the electromechanical actuator is moved into contact with the brake piston;
continuing actuation of the electromechanical actuator after the electromechanical actuator contacts the brake piston so as to generate the electromechanical displacement force on the brake piston; and
actuating the pressure generator during the continuing actuation of the electromechanical actuator to push brake fluid into the hollow chamber and generate the pressure displacement force, a clamping force of the brake piston acting on the wheel brake being a superposition of the electromechanical displacement force and the pressure displacement force; and
adjusting the actuation of the pressure generator based on a speed of movement of the electromechanical actuator so as to adjust a rate at which the pressure increases within the hollow chamber during the superposition of the electromechanical displacement force and the pressure displacement force.

10. The brake system of claim 9, wherein:
a target clamping force sufficient to hold the motor vehicle in place is formed from a superposition of a target electromechanical displacement force generated by the electromechanical actuator and a target pressure displacement force generated by the at least one pressure generator; and
the actuation device is further configured such that:
the continuing actuation of the electromechanical actuator includes continuing the actuation so as to steadily increase the electromechanical displacement force from the point at which the electromechanical actuator contacts the brake piston until the electromechanical actuator generates the target electromechanical displacement force;
the adjusting of the actuation of the pressure generator includes adjusting the actuation from the point when the electromechanical actuator contacts the brake piston, based on the speed of movement of the electromechanical actuator, so as to steadily increase the pressure displacement force until the pressure displacement force reaches the target pressure displacement force; and
the continuing actuation of the electromechanical actuator and the adjusting of the actuation of the pressure generator are executed in such a way that the target electromechanical displacement force and the target pressure displacement force are reached at the same point in time.

11. The brake system of claim 9, further comprising:
a plurality of brake circuits;
wherein the at least one wheel brake is one of a plurality of wheel brakes;
wherein at least one of the plurality of wheel brakes is allocated to each one of the plurality of brake circuits; and
wherein the actuation device, when activating the parking brake function, is further configured to selectively activate a sub-set of the plurality of brake circuits with reference to an inclination of the motor vehicle.

12. The brake system of claim 9, wherein the actuation device is further configured to monitor an operating current of the electromechanical actuator and determine the speed of movement of the electromechanical actuator based on the operating current.

13. The brake system of claim 12, wherein the adjusting of the actuation of pressure generator is based on the operating current.

* * * * *